United States Patent [19]

Cadiou

[11] 4,063,136

[45] Dec. 13, 1977

[54] METHOD AND CONTROL DEVICE FOR THE SERIES AND PARALLEL COUPLING OF ELEMENTS OF AN ELECTROCHEMICAL GENERATOR SUPPLYING A MOTOR

[75] Inventor: Jean Cadiou, Paris, France

[73] Assignee: Societe Anonyme Automobiles Citroen, Paris, France

[21] Appl. No.: 398,381

[22] Filed: Sept. 18, 1973

[30] Foreign Application Priority Data

Sept. 21, 1972 France .................. 72.33404

[51] Int. Cl.² .............................. H02P 7/06
[52] U.S. Cl. .................................. 318/139
[58] Field of Search ....................... 318/139, 440

[56] References Cited

U.S. PATENT DOCUMENTS

| | | | |
|---|---|---|---|
| 3,207,966 | 9/1965 | Parkinson | 318/139 |
| 3,349,309 | 10/1967 | Dannettell | 318/139 X |
| 3,686,549 | 8/1972 | Winebrener | 318/139 |
| 3,699,414 | 10/1972 | Gyori | 318/139 |
| 3,716,767 | 2/1973 | Kuriyama | 318/139 |

*Primary Examiner*—Robert K. Schaefer
*Assistant Examiner*—John J. Feldhaus

*Attorney, Agent, or Firm*—Stevens, Davis, Miller & Mosher

[57] ABSTRACT

The method modifies the coupling of the elements of electrochemical generator by commutating means enabling, according to the conditions of operation, the coupling of at least two groups, for example identical, of said elements either in parallel, or in series. The commutating means are actuated, as a function of at least one of the parameters of the power demanded at the motor, in such a way that whatever the rotary speed of the motor, parallel coupling is effected in all cases where the power demanded can be supplied by this coupling. A signal of the power demanded is established as a function of at least one parameter of the power actually delivered, and of at least one threshold signal corresponding to the maximum value which the abovesaid parameter can take, all things being otherwise equal, in parallel coupling. The signal of the power demanded and the threshold signal are compared and the passage from series coupling to parallel coupling is actuated when the signal of the power demanded is less than the threshold signal. The parameter selected may be the average voltage ($U_M$) of the induced coil of the motor or an image of this voltage.

20 Claims, 8 Drawing Figures

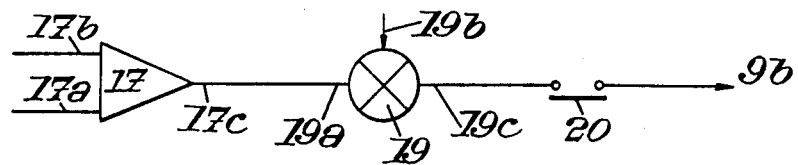
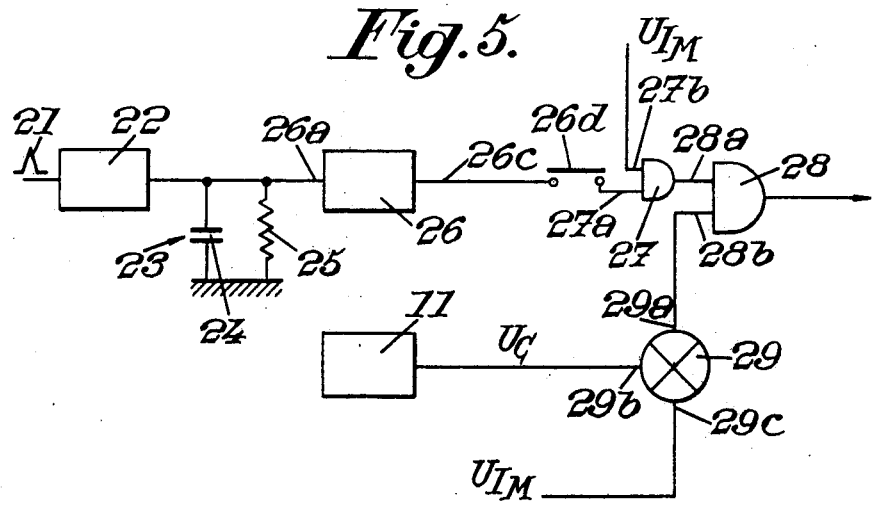
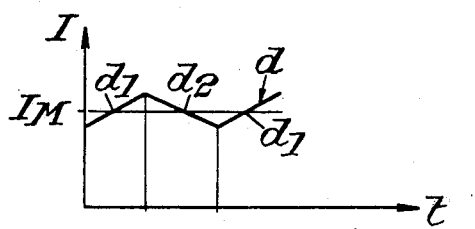

METHOD AND CONTROL DEVICE FOR THE SERIES AND PARALLEL COUPLING OF ELEMENTS OF AN ELECTROCHEMICAL GENERATOR SUPPLYING A MOTOR

The invention relates to a method for modifying coupling the elements of an electrochemical generator for supplying a continuous current motor, according to which method commutation means are used enabling, according to the operating conditions, the coupling of at least two groups, especially identical, of the elements of the generator, either in parallel, or in series.

The invention relates especially to the case where the electrochemical generator is intended to supply a motor driving a variable load and, more particularly, the case where the motor is intended for the propelling of an automobile vehicle.

It is already known to modify the series parallel coupling according to the conditions of operation of the motor, for example according to the rotary speed of this motor. The parallel coupling is reserved for low speeds whilst the series coupling is provided for the higher speeds.

However, according to the prior art, up to the present, maximum advantage has not been taken of the possibilities of series parallel coupling.

It is a particular object of the invention to render the method defined above such that it responds to the various exigencies of practice better than hitherto and for example such that it ensures operation of the electrochemical generator under optimal yield conditions by reduction of energy losses.

According to the invention, a method of the type defined above is characterised by the fact that commutating means are actuated, as a function of at least one of the parameters of power demanded by the motor, in such a way that whatever the rotary speed of the motor, the parallel coupling is effected in all cases where the power demanded can be supplied by this coupling.

Advantageously, to actuate the passage from series coupling to parallel coupling, there is established, on the one hand, a signal of the power demanded as a function of at least one parameter of the power actually delivered, and on the other hand, at least one threshold signal corresponding to the maximum value which the abovesaid parameter can take, all things being otherwise equal, in the coupling in parallel; the power signal required and the threshold signal are compared and the passage from series coupling to parallel coupling is actuated when the power signal demanded is less than the threshold signal.

For changing from series coupling to parallel coupling, the parameter chosen is advantageously the average induced voltage of the motor, or an image of this voltage, the power signal demanded being a function of this voltage, and the threshold signal being a function of the difference, or of an image of the difference, between the open voltage at the terminals of the electrochemical generator and the ohmic drop which is produced between the terminals of a resistance of the same value as the internal resistance of the generator and traversed by the average intensity of current which passes through the inductance of the motor.

The average intensity which passes through the motor can be either measured directly, or deduced from the torque of the motor.

To actuate the passage from parallel coupling to series coupling, there is preferably selected, as a parameter, the average intensity of current which passes through the inductance of the motor i.e. the motor coil.

Advantageously, a cut off device, of the chopper type, is provided to ensure regulation of the average intensity of the current passing through the inductance of the motor as a function of at least one parameter of the power demanded.

According to a first solution, the passage from parallel coupling to series coupling is actuated when the cut off device ensures permanent supply of the motor.

According to another solution, there is established, on the one hand, a signal of the power required, as a function of the difference between the intensity required and the average intensity passing through the inductance of the motor, and on the other hand, a threshold signal corresponding to a predetermined amplitude of the abovesaid difference, the two signals are compared and passage from parallel coupling to series coupling is actuated when the power signal demanded becomes greater than the threshold signal. Preferably, the power signal demanded is also compared with a reference signal and the closing or opening of the chopper type device is actuated according as the power signal demanded is greater or less than the reference signal. As a safety precaution, it may be ensured that the supply of the motor is permanent when the actuating signal for passage to series coupling is obtained according to the second solution.

The invention also relates to a device for the application of the method, adapted to modify the coupling of the elements of an electrochemical generator intended to supply a continuous current motor, this device comprising commutating means enabling, according to the conditions of operation, the coupling of at least two identical groups of elements of the generator either in series or in parallel.

According to the invention, this device is characterised by the fact that it comprises means sensitive to at least one parameter of the power demanded by the motor, and adapted to deliver a signal of the power demanded; means adapted to establish a threshold signal; and comparator means for the power signal demanded and for the threshold signal adapted to deliver, according to the result of the comparison, a control pulse for the passage from series coupling to parallel coupling or conversely.

For actuating the change from series coupling to parallel coupling, the means sensitive to at least one parameter of the power actually demanded by the motor are constituted by a voltage take-up circuit connected to the terminals of the inductance of the motor whilst the means adapted to establish the threshold signal comprise, on one hand, a source adapted to supply a voltage proportional to the open voltage of the generator, on the other hand, a circuit producing a voltage proportional to the intensity of the induction current of the motor and, on the other hand lastly, a differential amplifier having two inputs fed by signals coming from the abovesaid circuits and of which the output delivers a signal as a function of the difference between the abovesaid open voltage and the product of the average inductance intensity of the motor and the internal resistance of the generator.

The invention consists, apart from the features indicated above, of certain other features which will be more explicitly considered below with regard to preferred embodiments which will be described in detail, with reference to the accompanying drawings, but which are in no way limiting.

FIG. 1 of these drawings shows two curves representing the variations in the voltage plotted as ordinates as a function of the current intensity delivered, shown as abscissae, for two types of electrochemical generators.

FIG. 4 is a diagram of the control circuit for passage from series coupling to parallel coupling.

FIG. 5 is a diagram of the control circuit for the passage from parallel coupling to series coupling.

FIG. 6 shows the variations in electrical magnitudes as a function of time.

Figure 8:
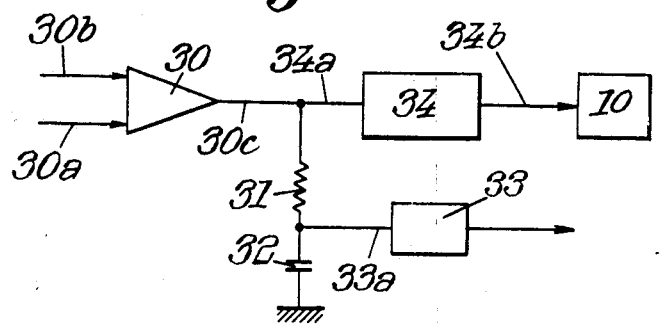

FIG. 8, lastly, is a diagram of another possible control circuit for passage to series coupling.

It should be recalled that, for a predetermined power delivered by an electrochemical generator, the yield of the latter is essentially effected by two types of losses.

There is firstly the losses due to the internal resistance of the generator which depend on the current intensity delivered by the latter. If $r$ is the internal resistance of the generator, these losses, expressed as power, are given by the formula:

$$W_1 = rI^2 \qquad (I)$$

Figure 1:
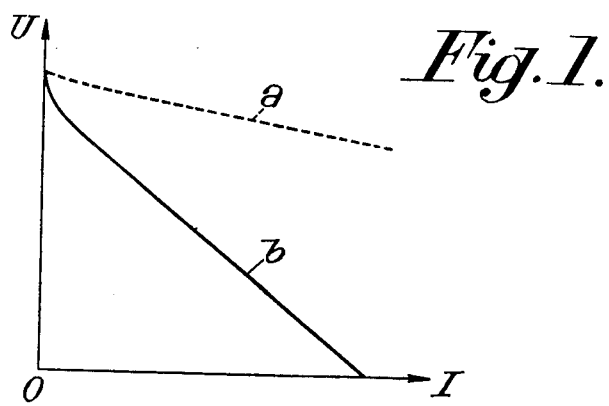

In the case of a conventional battery, the internal resistance $r$ is relatively low and the variation in the voltage at the terminals of the battery as a function of the current delivered is shown by the curve $a$ in FIG. 1 with the slight negative slope. In practice, whatever the current delivered, the losses of this type are relatively low.

On the other hand, in the case of an electrochemical generator, for example of the metal-air type, the voltage at the terminals of the generator drops quickly (curve $b$) when the intensity of the current delivered increases, since the internal resistance $r$ of such a generator is much higher than in the case of a conventional battery. As a result the losses which, according to formula (I), are directly proportional to the internal resistance of the generator, for a given intensity of the current supplied by this generator, will be higher.

To the losses mentioned previously, there must be added, in the case of a generator with a common liquid electrolyte, the losses due to the eddy currents through faulty insulation circulating in the electrolyte between the anodes brought to different potentials when the several elements are electrically connected in series. These currents will be denoted in the following by: "insulation currents".

In the case of $n$ electrochemical elements grouped electrically in series, and of which the anodes are supplied with electrolyte by parallel circuits, it can be shown that the losses ($W_2$) through the insulation current are expressed by:

$$W_2 = (u^2/R)(n(n^2-1)/6)$$

where $u$ is the electrical voltage at the terminals of one element; R depends on the electrical resistance of the fluid between two elements.

In the case of $q$ groups, each group comprising $n$ electrochemical elements mounted electrically in series, the losses through the insulation current will be:

- in parallel coupling of $q$ groups:

$$W_{2(p)} = q\left[\frac{u^2}{R} \cdot \frac{n(n^2-1)}{6}\right]$$

- in series coupling of $q$ groups, which corresponds to series coupling of $nq$ elements:

$$W_{2(s)} = \frac{u^2}{R} \cdot \frac{nq[(nq)^2-1]}{6}$$

The ratio of the losses due to the insulation currents between the series and parallel coupling is hence:

$$\frac{W_{2(s)}}{W_{2(p)}} = \frac{(nq)^2 - 1}{n^2 - 1}$$

$n$ being large in relation to 1

$$\frac{W_{2(S)}}{W_{2(p)}} \approx q^2 \qquad (II)$$

Thus, in the case of two groups of electrochemical elements, which can be coupled in parallel or in series, the insulation current losses will be substantially four times smaller in parallel coupling, for an equivalent elemental voltage $u$.

This power $W_2$ dissipated as insulation currents can be minimized by reducing the cross-section of the circulating pipes for electrolyte and by increasing their length, but at the same time the hydraulic energy necessary for ensuring the flow of this electrolyte is increased. In the case of a generator with circulating electrolyte, there is hence a limit beyond which increase in the energy absorbed by the circulating pump of the electrolyte is not compensated by the gain obtained over the losses due to the insulating currents.

There will now be considered an electrochemical generator G (FIG. 3) constituted by two identical groups 1, 2, of series mounted elements. These groups 1 and 2 are intended to supply a utilisation circuit constituted by a continuous current electric motor 3, preferably a series motor. This motor 3 is intended to drive a variable load and more particularly to propel an automobile vehicle (not shown).

Switch means 4 are provided to enable, according to conditions of operation of the motor 3, coupling of the groups of elements 1 or 2, either in parallel, or in series. These switching means comprise, for example, two contactors 5a, 5b mechanically coupled by a linkage 1. The arrangement of these contactors in the electrical circuit appears in FIG. 3, two studs 7a, 7b belonging respectively to each contactor being electrically connected. When the contactor 5a is closed at stud 6a, the contactor 5b is closed at stud 6b and the groups 1 and 2 are coupled in parallel. When the contactor 5a is closed on stud 7a, the contactor 5b is closed on stud 7b and the groups 1 and 2 are connected in series.

Of course, the electromechanical contactors 5a, 5b could be replaced by electronic commutation means.

The internal resistance of each group 1, 2 being equal to $r$, and the voltage at the terminals of each group being equal to U, the internal resistance and the voltage at the terminals of the equivalent generator to the two groups would be the following:

-in the case of parallel coupling, $r/2$ and U,
-in the case of series coupling $2r$, $2U$.

Referring to the formulae I and II giving the losses $W_1$ and $W_2$, it is observed that the losses in a series coupling would always be higher than in the case of parallel coupling for the same power supplied by the generator.

Figure 2:
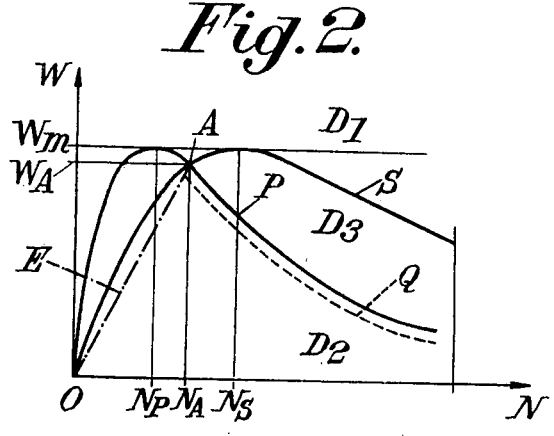
FIG. 2 shows characteristic curves of the maximum power which a generator-motor assembly can supply for parallel coupling or series coupling of the elements of the generator, the power being shown as ordinates and the rotary speed of the engine being shown as abscissae.

In the case of a direct current motor 3, of the series motor type, supplied by two groups 1 and 2, the maximum power available at the motor, as a function of the speed of rotation and of this motor, is represented, in FIG. 2, by the curve S for the series coupling of the groups 1 and 2 and by the curve P for parallel coupling. As coordinates, there are plotted the power W, and as abscissae, there is plotted the speed N. The two curves P and S possess a same tangent at the top of the ordinate $W_m$ which corresponds to the maximum power which can be supplied by the generator. It is observed that this maximum power is available, on series coupling, for a value $N_s$ of the rotary speed of the motor greater than the value $N_p$ for which the maximum power is produced in parallel coupling. $N_s$ is substantially equal to $2N_p$. The curves P and S cross at the point A with abscissa $N_A$ and ordinate $W_A$. For rotary speeds of the motor less than $N_A$, the curve P is situated above the curve S, whilst, for a rotary speed of the motor greater than $N_A$, the curve S passes above the curve P.

The curves P and S divide the quadrant (N, W) into three zones:

- the zone D1, situated above the curves P and S; this zone corresponds to conditions of operation impossible to satisfy with the generator supplying the motor;
- the zone D2, situated below the curve P; this zone corresponds to conditions of operation which can be satisfied with parallel coupling;
- the zone D3, comprised between the curves P and S, for speeds of rotation greater than $N_A$; conditions of operation in this zone can only be satisfied by series coupling.

In order to reduce losses, which, as explained previously, are greater in series coupling, according to the invention, parallel coupling is effected of the groups 1 and 2 in all cases where the conditions of operation of the motor 3 correspond to zone D2, including here high rotary speeds.

It will be noted that zone D2 can be limited, for reasons of safety, to speeds less than $N_A$, by a straight segment E (FIG. 2) joining the origin O to the point A. This straight segment corresponds to a limitation of the torque of the motor 3 to a constant value.

Since the torque of the motor 3 is proportional to the intensity of the current passing through the inductance of this motor, the segment E is obtained by using a conventional device (not shown) limiting the intensity of the induced current to a constant value. The electrical voltage at the terminals of the motor 3 is proportional to the rotary speed of this motor.

The contactors 5a, 5b (FIG. 3) are actuated by a winding 8 acting on the mechanical linkage 1 of these contactors. The linkage 1 is generally constituted by a movable member of an electro-magnet of which 8 is the winding.

The actuation of the contactors 5a, 5b is effected as a function of at least one of the parameters of the power actually required by the motor 3.

For this, there is applied to the winding 8 an actuating voltage coming from a control device 9, for example a bistable flip-flop of which one input 9a receives the electrical signal for placing in series and the other input 9b receives the signal for placing in parallel of the groups 1 and 2.

The supply of the motor 3 is advantageously ensured by means of a chopper device 10, also known under the name "chopper". This chopper device can be of any suitable conventional type, and preferably electronic. The chopper 10 delivers current pulses, of variable duration. This duration is controlled by a detector or a transducer 11 delivering a control voltage $U_c$ which depends on the position of the accelerator pedal 12.

This pedal 12, in moving, drives the slider 13 of the potentiometer of which the extreme terminals are respectively connected to ground and to a reference voltage source $U_o$, for example a stabilized supply. The voltage $U_c$, taken between the slider 13 and ground, increases proportionally as the pedal 12 is depressed and moves slider 13 towards the end of the rheostat brought to voltage $U_o$.

The voltage $U_c$ represents a programmed intensity $I_c$ which the chopper 10 must provide for supply of the motor. The motor torque being essentially a function of the induced current, it may be said that the driver of the vehicle, by acting on the pedal 12, demands, for a speed of rotation of the motor 3, a predetermined power at the latter.

The power actually required from the motor, for a predetermined speed of rotation, is hence represented by the programmed intensity $I_c$ or the voltage $U_c = K'''I_c$.

The power delivered by the motor, for a predetermined speed of rotation, is represented by the average intensity of the current passing through the inductance of the motor 3.

The electrical circuit is completed by an inductance 14 arranged between the chopper 10 and the motor 3 and intended to smooth the current supplied by the motor 3, that is to say intended to reduce the amplitude of the variations in intensity of this current as a function of time.

Figure 3:
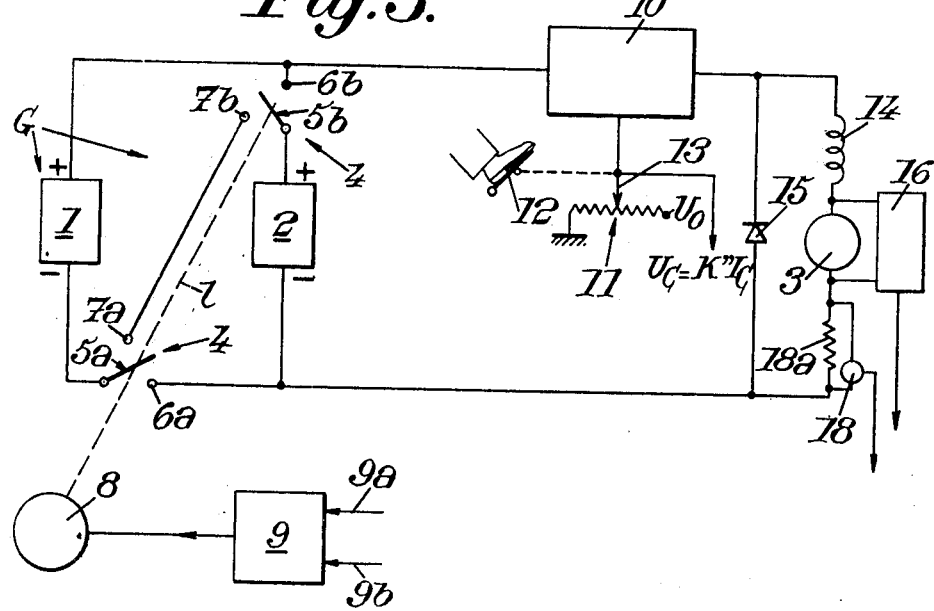
FIG. 3 shows a device according to the invention.

A diode 15, called a free-wheel diode, is connected between the terminals of the portion of the circuit comprising the inductance 14 and the motor 3; this diode is mounted in the direction indicated in FIG. 3.

When the chopper 10 does not conduct, this diode 15 enables the inductance 14 to restitute a portion of the energy that it had stored when the chopper 10 conducted. The variations in the induced current of the motor 3, as a function of time, are shown, in FIG. 6, by the curve $d$ of which the segments $d_1$ correspond to the conductive intervals of the chopper 10 and the segments $d_2$ to the intervals for which the chopper 10 is blocked, the inductance 14 then causing a current to flow in the diode 15. The average value of the current passing through the inductance of the motor is $I_M$ (FIG. 6).

To actuate the passage from series coupling of groups 1 and 2 to parallel coupling, a signal is produced of the power delivered or supplied by the motor 3, this signal being a function of at least one parameter of this power. Advantageously, the voltage $U_M$ at the terminals of the inductance of the motor 3 is selected and this voltage is measured by a circuit 16 (FIG. 3) connected to the abovesaid terminals of the motor.

There is also produced, a threshold signal, corresponding to the maximum value possible of the voltage $U_M$ at the terminals of the motor in parallel coupling of the groups 1 and 2 when they deliver the intensity of the motor 3.

This maximum value is equal to the voltage at the terminals of the generator formed by the groups 1 and 2 coupled in parallel and supplying a current of intensity $I_M$. If $U_o$ is the open voltage of each group, that is to say the voltage when no current is supplied by the group, the maximum value of the voltage at the terminals of the motor 3 will be equal to $U_o - r/2\ I_M$.

The expression of $r/2 \cdot I_M$ is equal to the ohmic draft in the generator due to its internal resistance in parallel coupling.

To produce the threshold signal, there is used, as shown in FIG. 4, a differential amplifier 17 with two inputs 17a, 17b; one of these inputs 17a, receives the constant signal representing the voltage $U_o$ and constituted by a stabilized reference voltage. The other input 17b receives the signal representing the product $r/2 \cdot I_M$. The signal sent to the input 17b is obtained from an amperimetric circuit 18 connected to the terminals of a shunt 18a mounted in the induction circuit of the motor 3.

The differential amplifier 17 delivers at its output 17c (FIG. 4) a signal representing the difference $U_o - r/2\ I_M$, that is to say the threshold signal. This threshold signal is sent to the input 19a of a comparator 19 of which another input 19b receives the signal representing the average voltage $U_M$ at the terminals of the motor 3.

The comparator 19 delivers at its output 19c a signal adapted to actuate the parallel coupling of the generators 1 and 2 if the following relation is verified:

$$U_M < U_o - r/2\ I_M.$$

If each member of this inequality is modified by the value $I_M$, there is refound an inequality stating that the power delivered is less than the maximum power which could be supplied, by parallel coupling of the groups 1 and 2.

The output 19c of the comparator 19 is connected to the input terminal 9b of the bistable flip-flop 9 (FIG. 3) through a contact 20 of which the closing is ensured when the groups 1 and 2 are coupled in series. This contact 20 can naturally be replaced by an "AND" logical circuit.

Under these conditions, the order for passage from series coupling to parallel coupling can only be transmitted to the flip-flop 9 if:
the groups 1 and 2 are in fact coupled in series, and $U_M < U_o - r/2\ I_M$.

According to a modification of the use of the circuit of FIG. 4, instead of sending the voltage $U_o$ (or its image) to the input 17a and the voltage $U_M$ (or its image) to the input 19b, the voltage $U_M$ is sent to the input 17a, the voltage $U_o$ to the input 19b and the differential amplifier is arranged so as to obtain at the output 17c the function $U_M + r/2\ I_M$, the input 17b still receiving a signal proportional to $I_M$.

The comparator 19 will give at its output 19c a signal for passage to parallel coupling when $U_M + r/2\ I_M < U_o$ This inequality is equivalent to the preceding inequality $U_M < U_o - r/2\ I_M$. But the threshold being fixed to the comparator 19 can be a threshold detector of the Schmidt trigger type.

Figure 7:
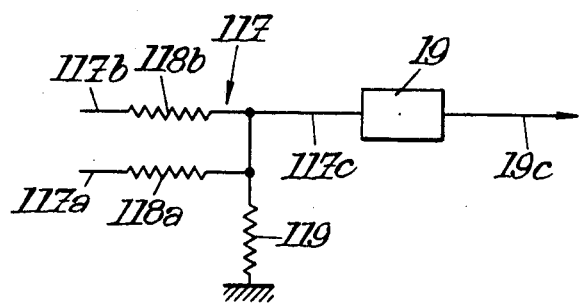
FIG. 7 shows a variation of the circuit of FIG. 4.

In FIG. 7, there is shown a simple circuit 117 enabling the obtaining at its outlet 117c of a linear function of the amplitudes of the signals applied to its inputs 117a, 117b. Each input is connected to the output 117c by a resistance, 118a and 118b respectively; these two resistances are hence in parallel. A resistance 119 connects the output 117c to ground. By sending to 117a a signal proportional to $U_M$ and to 117b a signal proportional to $I_M$ and by giving the resistances 118a, 118b, 119 suitable values, there is obtained at the output 117c a signal proportional to $U_M + r/2\ I_M$.

It will be noted that, to actuate passage from series coupling to parallel coupling, instead of selecting the voltage $U_M$ as the parameter of the power, there could have been selected the intensity $I_M$ passing through the motor. The value of this intensity would have constituted the signal of the power delivered, whilst the threshold signal, corresponding to the maximum value which the abovesaid intensity can take in parallel coupling for the operating voltage of the motor, would have been given by the expression:

$$\frac{2(U_o - U_M)}{r}.$$

One would then have compared the value $I_M$ with this expression and one would have actuated the passage to parallel coupling when $I_M$ would have been less than the abovesaid expression.

When the passage from series coupling to parallel coupling is actuated, the power of the electrochemical generator is sufficient to supply the motor; since the response time of the device actuating the chopper is short, it will be noted that, under these conditions, the average intensity delivered $I_M$ is equal to the intensity demanded or the programmed intensity $I_C$. In the preceding particularised examples, $I_M$ could be replaced by $I_C$. In particular the circuit itself for supplying a voltage as a function of the intensity of the induced current of the motor can be constituted either by the circuit 18 arranged to measure the intensity of the induced current, or by a circuit sensitive to the programmed intensity produced to monitor the chopper.

To actuate passage from parallel coupling to series coupling, in an other embodiment, there is selected as the parameter of the power delivered by the motor, the average intensity $I_M$ of the current passing through the induced coil of this motor. The power signal delivered represents the value of this average intensity $I_M$, whilst the threshold signal corresponds to the maximum value this intensity $I_M$ can assume. This maximum value is reached when the chopper 10 conduct permanently. This chopper generally comprises a thyristor and total conduction is reached when the thyristor is constantly closed. In this case, the chopper 10 no longer delivers pulses but a continuous current.

However, to avoid inadvertant switching, it must be checked that in addition to the condition of total conduction of the chopper 10, the driver of the vehicle demands from the motor 3 more power than parallel coupling of the groups and 2 can supply for the conditions of operation at the moment. It must then be verified that the intensity $I_M$ passing through the induced coil of the motor is less than the programmed intensity $I_C$ corresponding to the voltage $U_C$ set by the transducer 11 (FIG. 3). Finally, to actuate passage from parallel coupling to series coupling, the following three conditions must be fulfilled:
- groups 1 and 2 are coupled in parallel
- there is a total conduction of the chopper 10,
- $I_M$ is smaller than $I_C$.

To detect total conduction of the chopper 10, several criteria may be used.

Referring to FIG. 5, there can be seen an electrical diagram enabling the use as criteria of the pulses 21 actuating conduction of the chopper 10. These pulses 21, shown diagramatically, pass through a calibrating circuit 22 and are then integrated by a conventional integrater circuit 23, with a capacitor 24 and resistance 25 connected in parallel, and of which one terminal is connected to the ground.

The signal coming from this integrator 23 depends on the frequency of the release pulses 21 from the chopper. On permanent conduction of the chopper 10, this frequency is annulled. Passage from parallel coupling to series coupling will be actuated when the permanent conduction is practically reached, that is to say when the amplitude of the signal coming from the integrator 23 becomes less than a predetermined threshold.

For this, the signal emerging from the integrator 23 is sent to the input 26a of the comparator 26 (threshold device or "trigger"). If the signal present on the input 26a is less than the threshold, a signal for passage from parallel coupling to series coupling appears at the output 26c of the comparator.

To avoid continual switching at the limit of zones D2 and D3 (FIG. 2), the signal for passage from series to parallel coupling can be adjusted so that, in FIG. 2, the curve corresponding to the passage from series coupling to parallel coupling is located slightly below the curve P and is represented by the dashed arc Q.

A contact 26d, adapted to be closed when the groups 1 and 2 are coupled in parallel, is provided between the output 26c and an input 27a of an "AND" gate 27. The contact 26d could be replaced by a supplementary input of the "AND" gate 27.

It should be noted, that on the stopping of the motor, the frequency of the pulses 21 is nil and the signal coming from the integrator 23 will be less than the predetermined threshold.

To avoid actuating series coupling although the motor is stopped, it must be checked that the intensity $I_M$ of the current passing through the induced coil of the motor is not nil when the amplitude of the signal coming from the integrator 23 is less than the selected threshold. For this, the other input 27b of the gate 27 is fed by a voltage $U_{I_M}$ representing the average intensity $I_M$ passing through the induced coil of the motor 3. This voltage is obtained from a signal delivered by the circuit 18 (FIG. 3).

The "AND" gate 27 avoids placing in series on stopping.

The output of the "AND" gate 27 is connected to the input 28a of an other "AND" gate 28.

The other input 28b of the "AND" gate 28 is connected to the output 29a of a logical comparator 29. A first input 29b of this comparator 29 connected to the acceleration transducer 11 (FIG. 3) so as to be fed by a voltage $U_C$ representing the programmed intensity $I_C$ required by the driver.

The other input 29c of the comparator 29 is fed by the voltage $U_{I_M}$.

The comparator 29 delivers a signal at its output 29a when the average intensity $I_M$ is less than the programmed intensity $I_C$. It is clear that the "AND" gate 28 will only allow a signal to pass if the three previously stated conditions are fulfilled since a signal is required of the output 26c (total conduction), closing of the contact 26d (parallel coupling) and a signal at the input 28b ($I_M < I_C$).

Instead of selecting the opening of pulses of the chopper 10 as criteria of total conduction, there could be selected for example:
- the pulses connected with the opening of the chopper, for example ignition pulses,
- the dropping front of the current of the motor which corresponds to the segment $d_2$ of FIG. 6,
- the extinction pulses of chopper 10,
- the direct voltage of the free wheel diode 15,
- the alternating component of the motor voltage.

According to an other advantageous embodiment, to actuate the passage from parallel coupling to series coupling, there is selected as the signal of the power demanded the difference between the intensity of the current demanded or programmed intensity $I_C$ and the average intensity passing through the induced coil of the motor $I_M$. The threshold signal corresponds to a predetermined difference of the amplitude between the above-said intensities; passage to series is actuated when the power signal demanded becomes greater than the threshold signal.

In FIG. 8, there can be seen the diagram of the electronic circuit for the utilization of this embodiment.

A differential amplifier 30 comprises two inputs 30a, 30b to which are applied operating signals, respectively, of the average intensity $I_M$ passing through the induced coil of the motor and of the programmed intensity $I_C$. The differential amplifier 30 delivers at its output 30c a signal proportional to the difference $I_C - I_M$. The output 30c is connected to ground through a resistance 31 and a capacitor 32 arranged in series forming a predetermined constant time circuit. The portion of the circuit comprised between the resistance 31 and the capacitor 32 is connected to the input 33a of a comparator 33 which can be a threshold detector of the Schmidt trigger type.

The comparator 33 delivers at its output 33c a signal for passage from parallel to series when the input signal 33a (proportional to $I_C - I_M$) is greater than a predetermined threshold.

The criterion of total conduction is used, in addition, as a safety measure.

Preferably, the signal available at the output 30c is used also for monitoring the chopper 10.

For this, there is provided a threshold comparator 34 or "trigger" whose input 34a is connected to the output 30c. According as the signal at the input 34a, proportional to $I_C - I_M$, is greater or less than the threshold, the comparator 34 delivers at its output 34b a signal actuating the opening (conduction) or the closing (nonconduction) of the chopper 10.

With the method and device according to the invention, it is seen that, in all cases where the conditions of operation of the motor 3 are situated in the zone D2 of FIG. 2, whatever the rotary speed of the motor, parallel coupling of the groups of elements 1 and 2 will be realized and the power demanded will be supplied with the best possible yield since the losses will be reduced to the minimum.

There is here a very important advantage, especially in the case of a vehicle intended essentially to circulate in the town since maximum power is only demanded at a peak, for accelerations. However, on the average, the power demanded is not great and parallel coupling will be maintained for most of the time, even at high rotary speeds, which enables an appreciable gain in yield and prolongs the life-span and autonomy of electrochemical generators and the autonomy of the vehicle. On the stopping of the vehicle, there will still be parallel coupling which minimizes the losses through short circuit.

The invention enables the use of an electrochemical generator for supplying electric power adjusted to an extremely variable demand exacted by a control member such as the accelrator pedal of an automobile, under optimum yield conditions where the power demanded can be obtained.

I claim:

1. Method for modifying the coupling of elements of an electrochemical generator for supplying a continuous current motor, comprising using commutating means enabling, according to the conditions of operation, the coupling of at least two groups of elements of the generator, either in parallel or in series, and actuating the commutating means as a function of at least one of the parameters of the power demanded at the motor, in such a way that whatever the rotary speed of the motor, parallel coupling is effected in all cases where the power demanded can be supplied by this coupling.

2. Method according to claim 1, comprising, to actuate the passage from series coupling to parallel coupling, establishing, on one hand, a signal of the power demanded, as a function of at least one parameter of the power actually delivered, and on the other hand, at least one threshold signal corresponding to the maximum value which the abovesaid parameter can take, all things being otherwise equal, in parallel coupling; comparing the signal of the power demanded and the threshold signal and actuating the passage from series coupling to parallel coupling when the signal of the power demanded is less than the threshold signal.

3. Method according to claim 2, wherein the parameter selected is the average voltage ($U_M$) of the induced coil of the motor, or an image of this voltage, the signal of the power demanded being a function of this voltage, and the threshold signal being a function of the difference or an image of the difference, between the open voltage ($U_o$) at the terminals of the electrochemical generator and the ohmic drop, which is produced between the terminals of a resistance of the same value ($r/2$) as the internal resistance of the generator in parallel coupling and traversed by the average intensity $I_M$ which passes through the induced coil of the motor.

4. Method according to claim 2, wherein there are selected as parameters the average voltage of the induced coil ($U_M$) of the motor or an image of this voltage, the average intensity ($I_M$) of the current passing through the induced coil of the motor or an image of this intensity, the power signal demanded being constituted by the voltage ($U_M + r/2\ I_M$) which would be necessary to the terminals of the generator to obtain in parallel this average voltage ($U_M$) induced coil taking into account the ohmic drop ($r/2\ I_M$) which is produced between the terminals of the resistance of same value as the internal resistance ($r/2$) of the generator in parallel coupling and passed through by the average intensity ($I_M$) which traverses the induced coil of the motor; the signal is compared with a voltage ($U_o$) equal to the open voltage at the terminals of the generator in parallel coupling and passage from series coupling to parallel coupling is actuated when the power signal demanded ($U_M + r/2\ I_M$) is less than the open voltage ($U_o$) at the terminals of the generator in parallel coupling.

5. Method according to claim 3, wherein the average intensity ($I_M$) which passes through the induced coil of the motor is measured directly.

6. Method according to claim 3, wherein the value of the average intensity ($I_M$) which passes through the induced coil of the motor is deduced from the value of the average torque of this motor.

7. Method according to claim 1, wherein there is provided a cut-out device of the chopper type, to ensure regulation of the average intensity ($I_M$) of the current passing through the induced coil of the motor as a function of at least one parameter of the power demanded, actuating means of the cut-off device being provided to set a programmed intensity ($I_c$) which this cut-off device must deliver, this programmed intensity corresponding to the power demanded.

8. Method according to claim 7, wherein the parameter selected is the average voltage ($U_M$) of the induced coil of the motor or an image of this voltage, the signal of the power demanded being a function of this voltage, and the threshold signal being a function of the difference or an image of the difference, between the open voltage ($U_o$) at the terminals of the electrochemical generator and the ohmic drop, which is produced between the terminals of a resistance of the same value ($r/2$) as the internal resistance of the generator in parallel coupling and traversed by the average intensity $I_M$ which passes through the induced coil of the motor and wherein the programmed intensity ($I_c$) is taken as a value of the average intensity ($I_M$) which passes through the induced coil of the motor.

9. Method according to claim 7, wherein passage from parallel coupling to series coupling is actuated when the cut-off device ensures permanent supply of the motor.

10. Method according to claim 9, wherein there is selected as criterion of permanent supply, the pulses actuating the conduction of the chopper, these pulses are integrated to produce a representative signal of the power demanded, this signal of the power demanded is compared with a threshold signal constituted by a reference voltage and the passage to series is actuated when the comparison indicates that the signal of the power demanded is less than the threshold signal and the average intensity ($I_M$) of the current passing through the induced coil of the motor is not nil.

11. Method according to claim 7, wherein there is established, on one hand, a signal of the power demanded, the function of the difference ($I_c-I_M$) between the intensity demanded ($I_c$) and the average intensity ($I_M$) passing through the induced coil of the motor, and on the other hand, a threshold signal corresponding to a predetermined amplitude of the above-said difference, the two signals are compared and the passage from parallel coupling to series coupling is actuated when the signal of the power demanded becomes greater than the threshold signal.

12. Method according to claim 11, wherein the signal of the power demanded is also compared with the reference signal and the closing or opening of the chopper type device is actuated according as the signal of the power demanded is greater or less than the reference signal.

13. Method according to claim 1, wherein said two groups are identical.

14. Method according to claim 1, wherein a motor of the series type is used.

15. Device adapted to modify the coupling of elements of an electrochemical generator for supplying a continuous current motor, this device comprising commutating means, enabling, according to the conditions of operation, coupling of at least two groups of elements of the generator, either in parallel or in series, said device also comprising means sensitive to at least one parameter of the power actually demanded by the motor and adapted to deliver a representative signal of the power demanded, means adapted to establish a threshold signal corresponding to the maximum value which the above-said parameter can take in parallel coupling, and comparator means of the siganl of the power demanded and of the threshold signal adapted to deliver, according to the result of the comparison, an actuating pulse for passage from series coupling to parallel coupling or conversely.

16. Device according to claim 15, wherein for actuating passage from series coupling to parallel coupling, the means sensitive to at least one parameter of the power actually demanded by the motor are constituted by a circuit taking the voltage at the terminals of the induced coil of the motor, whilst the means adapted to establish the threshold signal comprise, (a) a source adapted to supply a stabilized given voltage, (b) a circuit adapted to supply a voltage as a function of the intensity of the induced current of the motor, and lastly, (c) a differential amplifier having two inputs fed by signals coming from the abovesaid circuits (a) and (b) and of which the output delivers a signal as a function of the difference between the abovesaid open voltage and the product of the average induced intensity of the motor and the internal resistance of the generator in parallel coupling.

17. Device according to claim 15, wherein for controlling the passage from series coupling to parallel coupling, the means adapted to establish a signal of the power demanded comprise a circuit taking the voltage of the terminals of the induced coil of the motor, a circuit adapted to supply a voltage as a function of the intensity of the induced current of the motor and a circuit with two inputs, connected respectively to the outputs of the two preceding circuits, enabling the obtaining, at the output, of a signal proportional to the sum of the voltage of the terminals of induced coil of the motor and of the product of the average intensity of the induced current and the internal resistance of the generator in parallel coupling, the means adapted to produce a threshold signal being arranged to supply a fixed threshold representing the open voltage (Vo) at the terminals of the generator in parallel coupling, the abovesaid threshold means being for example comprised in the comparator means constituted by a threshold device of the trigger type.

18. Device according to claim 16, wherein the circuit adapted to supply a voltage as a function of the intensity of the induced current of the motor is arranged to measure the intensity ($I_M$) of the induced current.

19. Device according to claim 16, wherein the circuit adapted to supply a voltage as a function of the intensity of the induced current of the motor is sensitive to the programmed intensity ($I_c$) produced to monitor the chopper.

20. Apparatus for controlling a power supply for an electric motor comprising:
   at least two groups of electrochemical generating means for supplying electrical energy to said motor;
   means for monitoring at least one operating condition of said motor;
   chopper means coupled between the output of said at least two groups of generating means and an input of said motor for supplying pulse signals to energize said motor;
   throttle means connected to control current flow through said motor;
   commutation means coupled to said at least two groups of electrochemical generating means for switching the coupling of said at least two groups between series and parallel coupling as a function of said operating condition of said motor.

* * * * *